(12) United States Patent
Snow et al.

(10) Patent No.: US 6,487,847 B1
(45) Date of Patent: Dec. 3, 2002

(54) GAS TURBINE ENGINE FUEL CONTROL SYSTEM

(75) Inventors: Barton Hunter Snow, Wyoming, OH (US); Mitchell Donald Smith, Morrow, OH (US)

(73) Assignee: General Electric Company, Schenectady, NY (US)

( * ) Notice: Subject to any disclaimer, the term of this patent is extended or adjusted under 35 U.S.C. 154(b) by 44 days.

(21) Appl. No.: 09/706,388

(22) Filed: Nov. 3, 2000

(51) Int. Cl.[7] ............................... F02K 3/10
(52) U.S. Cl. ........................... 60/235; 60/764
(58) Field of Search ................. 60/235, 236, 237, 60/238, 239, 764

(56) References Cited

U.S. PATENT DOCUMENTS

| | | | | |
|---|---|---|---|---|
| 3,073,335 A | * | 1/1963 | Broders et al. | ............. 60/238 |
| 3,080,709 A | * | 3/1963 | Rand | ............. 60/238 |
| 3,289,411 A | * | 12/1966 | Rogers et al. | ............. 60/237 |
| 3,961,859 A | * | 6/1976 | Cygnor et al. | ............. 415/18 |
| 5,197,280 A | | 3/1993 | Carpenter et al. | ............. 60/204 |
| 5,259,186 A | | 11/1993 | Snow | ............. 60/39.281 |
| 5,379,585 A | | 1/1995 | Snow et al. | ............. 60/204 |
| 5,715,674 A | | 2/1998 | Reuter et al. | ............. 60/39.281 |
| 5,806,300 A | | 9/1998 | Veilleux, Jr. et al. | ............. 60/39.281 |

* cited by examiner

Primary Examiner—Louis J. Casaregola
(74) Attorney, Agent, or Firm—Rodney M. Young; Alfred J. Mangels

(57) ABSTRACT

A fuel control system for an aircraft gas turbine engine that includes a thrust augmentation system. An augmentor fuel pump is arranged to provide pressurized fuel to an exhaust nozzle throat area actuation system to eliminate the need for a separate hydraulic pump to provide pressurized fluid for exhaust nozzle actuation. An augmentor fuel bypass arrangement is provided to enable the augmentor fuel pump to provide pressurized fuel to the main fuel pressurizing valve and to components operated by the main fuel system in the event of failure of the main fuel pump. The augmentor fuel pump pressure and output flow are controlled as a function of thrust augmentation demand and main fuel system operation. The system provides redundancy by enabling either the main fuel system or the augmentor fuel system to maintain engine operation if one of the fuel systems fails or provides inadequate fuel flow.

19 Claims, 7 Drawing Sheets

GAS TURBINE ENGINE FUEL CONTROL SYSTEM

STATEMENT REGARDING FEDERALLY SPONSORED DEVELOPMENT

This invention was made with U.S. government support under Contract No F33615-988-C-2901 awarded by the Department of the Air Force. The U.S. government has certain rights in this invention.

BACKGROUND OF THE INVENTION

The present invention relates to aircraft gas turbine engines having a thrust augmentation system for selectively providing increased thrust output for limited times. More particularly, the present invention relates to a fuel control system for a gas turbine engine having a thrust augmentor, and in which an augmentor fuel pump provides the usual augmentor fuel supply function and also provides pressurized fuel for actuation of several hydraulic actuators for controlling engine operation. The augmentor fuel control system can serve as a backup fuel system in the event the engine's main fuel pump becomes inoperable. Because the augmentor fuel pump can provide fuel both for hydraulic pressure demands and also for augmentor fuel demands at most flight conditions, the main and augmentor fuel systems are, in effect, dual redundant to maintain engine operation over a wide range of engine operating conditions.

Aircraft gas turbine engines sometimes include a thrust augmentation system for providing increased thrust for particular portions of an aircraft flight regime. Such increased thrust can advantageously be utilized at takeoff, and at other times when high-speed dash capability is desired to respond to particular exigencies during flight. Typically, the thrust provided by an engine that includes a thrust augmentation system can be of the order of about 150% of the thrust of the main engine when it is not in the augmented thrust mode.

Because of the magnitude of the increased fuel flow demanded during augmented thrust operation, the engine main fuel pump for the core engine normally does not have the volumetric capacity to provide the required increased fuel flow for full flight range augmented operation. Accordingly, an additional, augmentor fuel pump is provided to furnish the required additional fuel flow to allow operation of the augmentor over the full flight range. Typically, the augmentor fuel pump is a centrifugal pump. And because the augmentor is either in an on condition or an off condition, the augmentor fuel pump can be readily sized to provide the desired fuel flow when augmentation is demanded.

Aircraft gas turbine engines having a thrust augmentation system which is generally positioned downstream of the main or core engine, require the provision of a variable area exhaust nozzle in order to avoid the imposition of an excessive back pressure on either the fan or the main engine when the augmentor is in operation. Unless the exhaust nozzle area is increased when augmentation is in effect, the increased velocity imparted to the exhaust gas by the augmentor can cause an undesirable pressure build-up within the engine unless pressure relief is provided by increasing the exhaust nozzle area. Such increased back pressure can cause undesired engine operation, possibly even fan or compressor stall if the back pressure is of a sufficiently high magnitude.

The incorporation of a variable area exhaust nozzle thus requires that there be provision for a nozzle actuation system to enable the exhaust nozzle area to be changed when required during augmentor operation. Typical variable area exhaust nozzles have a series of interleaved panels that define a flow path of circular cross section. The panels are slidable relative to each other in a circumferential direction to allow the nozzle area to be enlarged or reduced, as dictated by the engine operating conditions. When a converging-diverging exhaust nozzle is employed, the throat area and the outlet area of the nozzle can be linked together mechanically in a predetermined relationship, or they can be separately actuated. Additionally, if desired a converging-diverging exhaust nozzle can also be angularly displaceable to provide vectored thrust is a direction that is at an acute angle relative to the engine longitudinal centerline.

Actuation of the leaves of the exhaust nozzle to change the nozzle area is generally effected by a separate, variable displacement hydraulic pump that provides pressurized fluid, such as engine lube oil, or the like, to several piston-cylinder-type actuators that are circumferentially arranged about the outer shell of the augmentor. The provision of such an additional pump, along with the attendant pump drive system, hydraulic conduits, hydraulic fluid cooling apparatus, and the like, adds additional weight and cost to the engine, each of which is, of course, undesirable in an aircraft engine. And because relatively large forces are required to actuate the exhaust nozzle leaves to thereby change the nozzle area, the large actuation forces are generally provided by utilizing high hydraulic pressures in order to minimize the size and the weight of the nozzle actuators.

It is therefore desirable to provide an aircraft gas turbine engine having a thrust augmentation system in which operation of the exhaust nozzle actuators can be effected without the additional weight of a separate hydraulic pump and without the weight and space occupied by its associated additional piping, valves, and other hardware.

BRIEF SUMMARY OF THE INVENTION

Briefly stated, in accordance with one aspect of the present invention, a thrust augmentation system for an aircraft gas turbine engine is provided in which the augmentor fuel system is configured to provide pressurized fuel to operate the exhaust nozzle actuators and also provides a selectable ability to supply main burner fuel. The augmentor fuel system includes an augmentor fuel pump having the fuel pump inlet in communication with the source of fuel and having a fuel pump outlet. An augmentor fuel distributor is connected with the augmentor fuel pump outlet for receiving and distributing pressurized fuel to the thrust augmentor. A pressurized-fuel-operated actuator is connected with the augmentor fuel pump outlet for receiving pressurized fuel and for operating an actuatable position control element. A flow control valve is positioned between the augmentor fuel pump and the actuator for controlling the pressure of and the rate of fuel flow from the pump to the actuator. Augmentor fuel flow is controlled by an augmentor fuel control valve connected with the augmentor fuel pump and with the flow control valve for regulating delivery pressure and flow rate of fuel from the augmentor fuel pump in response to engine operating parameters and engine output demand parameters.

In accordance with another aspect if the present invention, a method is provided for controlling exhaust nozzle area by utilizing pressurized fuel from the augmentor fuel pump.

BRIEF DESCRIPTION OF THE DRAWINGS

The structure, operation, and advantages of the present invention will become further apparent upon consideration of the following description, taken in conjunction with the accompanying drawings, in which.

DETAILED DESCRIPTION OF THE INVENTION

Figure 1:
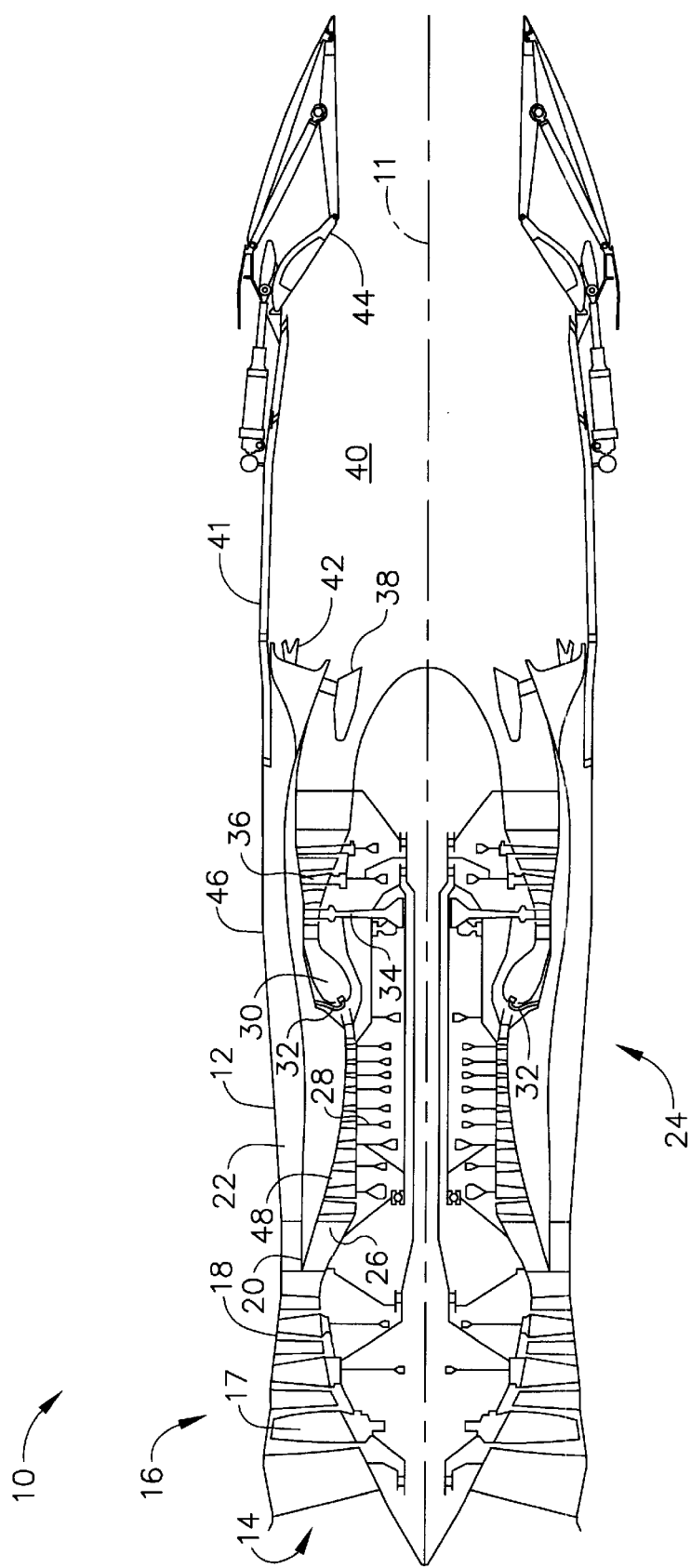
FIG. 1 is a longitudinal, cross-sectional view of a turbofan aircraft gas turbine engine having a thrust augmentation system and including a variable area exhaust nozzle.

Referring now to the drawings, and particularly to FIG. 1 thereof, there is shown a longitudinal cross-sectional view of an aircraft gas turbine engine 10 that is surrounded by an annular outer casing 12 that encloses the several components of the engine. Engine 10 has a longitudinal axis 11, about which the several rotating components of the engine rotate. An air inlet 14 is provided into which air is drawn to enter a fan section 16 within which the pressure and the velocity of the inlet air are increased. Fan section 16 includes a multiple-stage fan 17 that is enclosed by a fan casing 18.

Fan outlet air that exits from fan 17 passes an annular divider 20 that divides the fan outlet air stream into a bypass airflow stream and a core engine airflow stream. The bypass airflow stream flows into and through an annular bypass duct 22 that surrounds and that is spaced outwardly from core engine 24. The core engine airflow stream flows into an annular inlet 26 of core engine 24.

Core engine 24 includes an axial-flow compressor 28 that is positioned downstream of inlet 26 and that serves to further increase the pressure of the air that enters inlet 26. High-pressure air exits from compressor 28 and enters an annular combustion chamber 30 into which fuel is injected from a source of fuel (not shown) through a plurality of respective circumferentially-spaced fuel nozzles 32. The fuel-air mixture is ignited to increase the temperature of, and thereby to add energy to, the pressurized air that exits from compressor 28. The resulting high temperature combustion products pass from combustion chamber 30 to drive a first, high-pressure turbine 34 that is drivingly connected with and that rotates compressor 28. After exiting from high-pressure turbine 34 the combustion products then pass to and enter a second, low-pressure turbine 36 that is drivingly connected with and that rotates fan 17. The combustion products that exit from low-pressure turbine 36 then flow into and through an augmentor 40 that is enclosed by a tubular casing 41, to mix with bypass airflow that enters augmentor 40 from bypass duct 22. The core engine mass flow of air and combustion products, and the bypass airflow, together exit from engine 10 through exhaust nozzle 44, which as shown is a converging-diverging nozzle, to provide propulsive thrust.

In the augmented mode, additional fuel is introduced into the core engine combustion products at a point downstream of low-pressure turbine 36. Fuel is also introduced into the bypass air stream at substantially the same position along engine longitudinal axis 11. In that connection, flameholders 38 and 42 are provided in the core engine flow stream and in the bypass flow stream, respectively, to stabilize the flame fronts in each of the main and bypass flow streams.

Figure 2:
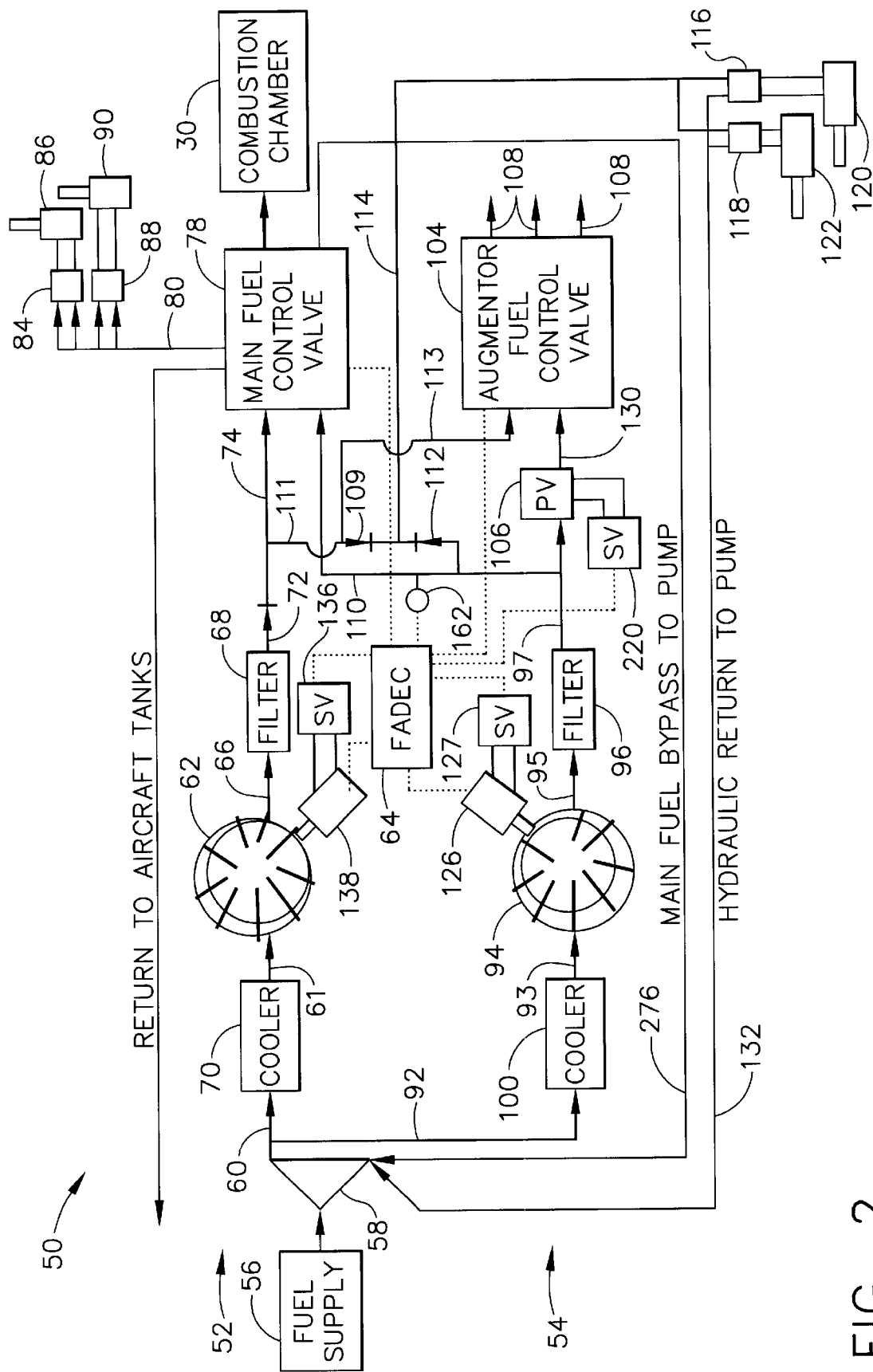
FIG. 2 is a schematic diagram of an aircraft gas turbine fuel system for an engine incorporating a thrust augmentation system, showing an embodiment of the present invention.

A fuel system 50 that provides the advantages of the present invention is shown schematically in FIG. 2 and includes both a main fuel system 52 and an augmentor fuel system 54. A fuel supply 56 is provided in fuel tanks (not shown) carried by the aircraft, and a boost pump 58 is provided to increase the pressure of the fuel drawn from fuel supply 56 before the fuel is supplied to either of the engine high pressure fuel pumps. Fuel flows from boost pump 58 to main fuel system 52 through a fuel conduit 60 that extends to the inlet of a main fuel-oil cooler 70 and then through conduit 61 to main fuel pump 62, which is a variable displacement pump, and can be a variable vane pump, as shown in FIG. 2.

Variable-vane-type pumps include an inner rotor body that is rotatably carried in an outer casing, and the rotor carries a plurality of radially-extending vanes that are movable radially relative to the rotor. An annular ring is positioned within the outer casing and surrounds the rotor. The annular ring has an inner diameter that is larger than the outer diameter of the rotor body, and the ring is carried within the housing in such a way that it can be moved diametrically relative to the rotor body axis. Thus, the shape of the inner chamber that is defined by the space between the annular ring and the rotor body can be varied by moving the annular ring so that its central axis is shifted relative to the central axis of the rotor. Shifting the annular ring diametrically relative to the rotor body operates to change the radial lengths of the vanes that extend from the rotor body, thereby permitting variation in and control over the output flow from such a pump. As will be appreciated by those skilled in the art, other types of variable displacement pumps, such as piston pumps, axial piston pumps with swash plates, and the like, can also be utilized, if desired. However, a variable vane pump, because of its structural simplicity and because of the straight-line control movement of the annular ring, allows a simple and easily controllable actuation arrangement to vary the displacement of the pump.

Pump 62 is driven by a power-take-off arrangement (not shown) from the main engine drive shaft through a suitable gearbox to provide to main fuel pump 62 rotary power at a desired torque level and shaft speed. Operation of main fuel pump 62 is monitored and controlled by an electronic engine control 64, such as a full authority digital electronic control (FADEC) which receives input signals from the engine that are representative of various engine operating parameters, and also input signals from the airframe, such as engine power demand. Engine control 64 includes dual channels to provide redundant engine control loops that receive dual sensed parameter inputs to allow dual outputs.

Typical input signals to electronic engine control 64 include airframe power lever position, engine and fan rotational speeds, compressor discharge pressure, turbine exhaust temperature, variable stator vane position, fan stator vane position, and exhaust nozzle area, as well as the positions of any other variable position elements of the engine. Depending upon the level of sophistication desired of main fuel system 52, information relating to additional engine operating parameters can also be provided, as will be appreciated by those skilled in the art.

Fuel from the outlet of main fuel pump 62 proceeds through a conduit 66 to main fuel filter 68, and then through a check valve 72 and via conduit 74 to the main engine fuel control 78. Main fuel control valve 78 regulates the rate of fuel flow to fuel nozzles 32 of combustion chamber 30 shown in FIG. 1. Fuel from main fuel pump 62 is also supplied through conduit 80 to one or more variable engine geometry actuation systems, such as a compressor stator vane actuator 86 and a fan guide vane actuator 90.

As shown in FIG. 2, one variable engine geometry actuation system can be a compressor variable stator vane positioning system for changing the positions of compressor stator vanes. The stator vane positioning system includes a variable stator vane servo valve 84 and one or more stator vane actuators 86 that are connected to a suitable actuation linkage (not shown) that operates to change the angular positions of the compressor stator vanes in response to engine operating conditions and engine power demands. Compressor stator vane servo valve 84 is dual redundant, and is operated either by main fuel pressure or by augmentor fuel pressure, each of which is provided from main fuel control valve 78 through conduit 80. Other variable engine geometry control arrangements can also be operated by the main fuel system, such as a variable fan guide vane actuation system that can include a fan guide vane servo valve 88 and one or more fan guide vane actuators 90, that can be similar to those provided for the compressor stator vane positioning system. Actuator 90 can also be operable through a suitable actuation linkage (not shown) that serves to position engine fan guide vanes at a desired angle, depending upon engine operating conditions and engine power demands. Servo valves 84, 88 are operated by electrical signals from engine electronic control 64 using actuator position feedback and other control parameters that are provided to control 64. The servo return lines (not shown) return leakage and servo flow to fuel conduit 60 at a point downstream of boost pump 58.

Also as shown in FIG. 2, thrust augmentor fuel system 54 is a fuel flow loop that is distinct from that associated with main engine fuel system 52. Augmentor fuel system 54 receives fuel through conduit 92 from boost pump 58 and conveys the fuel to the inlet of a fuel-oil cooler 100 and then through conduit 93 to the inlet of an augmentor fuel pump 94. Augmentor fuel pump 94 is also driven by a power-take-off arrangement that is operatively connected with the engine drive shaft through a suitable drive system, and it provides pressurized fuel through conduit 95 to a fuel filter 96 and then through conduit 97 to a servo operated pressurizing valve 106.

Fuel flows from pressurizing valve 106 through a conduit 130 to an augmentor fuel control valve 104 that distributes the fuel to the several fuel introduction zones 108 typically provided in a thrust augmentation system. In that regard, three such zones are represented in FIG. 2.

Pressurized fuel from augmentor fuel pump 94 is also conveyed through a branch conduit 110, that branches from conduit 97, to a check valve 112 and via conduit 114 to exhaust nozzle area servo valves 116 and 118. The fuel then is conveyed to actuators 120 and 122 that are provided for changing the exhaust nozzle throat area and the nozzle outlet area in response to engine operating conditions. If desired, an interconnection, such as a linkage system (not shown), can be provided to interconnect the structure that defines the nozzle throat area with the structure that defines the nozzle outlet area so that the respective areas follow a predetermined area interrelationship. Nozzle actuator flow is returned via line 132 to the discharge of boost pump 58, where it is mixed with cooler fuel from the aircraft fuel tank.

Conduit 111 extends from conduit 74 in main fuel system 52 to conduit 114 in augmentor fuel system 54 and includes check valve 109. Conduit 111 thereby allows main fuel pump 62 to supply pressurized fuel to operate the exhaust nozzle actuators if the pressure within conduit 110 falls to a level indicative of an insufficient supply of pressurized fuel from augmentor fuel pump 94. Branch conduit 113 extends from conduit 111 to augmentor fuel control valve 104, to also allow restricted operation of the augmentor by utilizing pressurized fuel from main fuel pump 62, should the output from augmentor fuel pump 94 be inadequate.

Augmentor fuel pump 94 and augmentor pressurizing valve 106 are each controlled by electronic engine control 64. Input parameters to the electronic engine control for those control functions include RPM, fuel pressure, pump stroke, and engine power demand. Augmentor fuel control valve 104 and servo valves 116, 118 for exhaust nozzle actuators 120 and 122, respectively, are also controlled by engine electronic control 64, and the input parameters for those functions traditionally include power lever angle, augmentor fuel flow demand, main combustion chamber pressure, engine inlet temperature, exhaust nozzle throat area, exhaust nozzle outlet area, exhaust nozzle throat pressure, and ambient pressure.

Fuel system 50 shown in FIG. 2 also includes provisions for supplying backup fuel flow from augmentor fuel pump 94 to main fuel system 52 should main fuel pump 62 fail. Branch conduit 110 conveys pressurized fuel from augmentor fuel pump 94 to main fuel control valve 78. Thus, augmentor fuel can also be provided to branch conduit 80 from augmentor fuel pump 94 as backup to operate the variable engine geometry elements that are normally operated by pressurized fuel supplied by main fuel system 52, in this case compressor stator vane servo valve 84 and fan variable guide vane servo valve 88 and the accompanying actuators 86 and 90. Thus, should main fuel pump 62 fail, the engine can continue to operate, but under restricted-augmentation conditions, by diverting fuel flow from the outlet of augmentor fuel pump 94 to main fuel control valve 78 and to the several variable engine geometry elements that normally receive pressurized fuel from main fuel pump 62.

Because of the varying flow and pressure demands that can be placed on augmentor fuel pump 94, and in order to enable the pump to respond to and to accommodate those varying demands without excessively heating the fuel, the augmentor fuel pump can be a variable displacement pump for improved efficiency. One form of variable displacement pump that can be utilized is a variable-vane-type pump, although other forms of variable displacement pumps, such as pumps containing pistons or including centrifugal elements, can also be utilized.

The displacement of augmentor pump 94 can be controlled by engine electronic control 64 via servo valve 127 and actuator 126, which controls the position of the annular ring relative to the rotor body axis. The desired flow from pump 94 is calculated and the pump displacement is modified to respond to the flow value resulting from the flow calculation.

Augmentor pressurizing valve 106 is preferably a servo-operated valve to regulate the discharge pressure of the fuel that flows from augmentor fuel pump 94. In that regard, servo valve 220 receives position commands from engine electronic control 64. Pressurizing valve 106 can be regulated in response to input signals representative of engine operation and power demand, including signals representative of such parameters as the actual hydraulic pressure, the exhaust nozzle throat area, and the exhaust nozzle throat static pressure. Those parameters are used to calculate an hydraulic pressure level, so that the pressurizing valve can be controlled to provide the calculated hydraulic pressure value.

Figure 3:
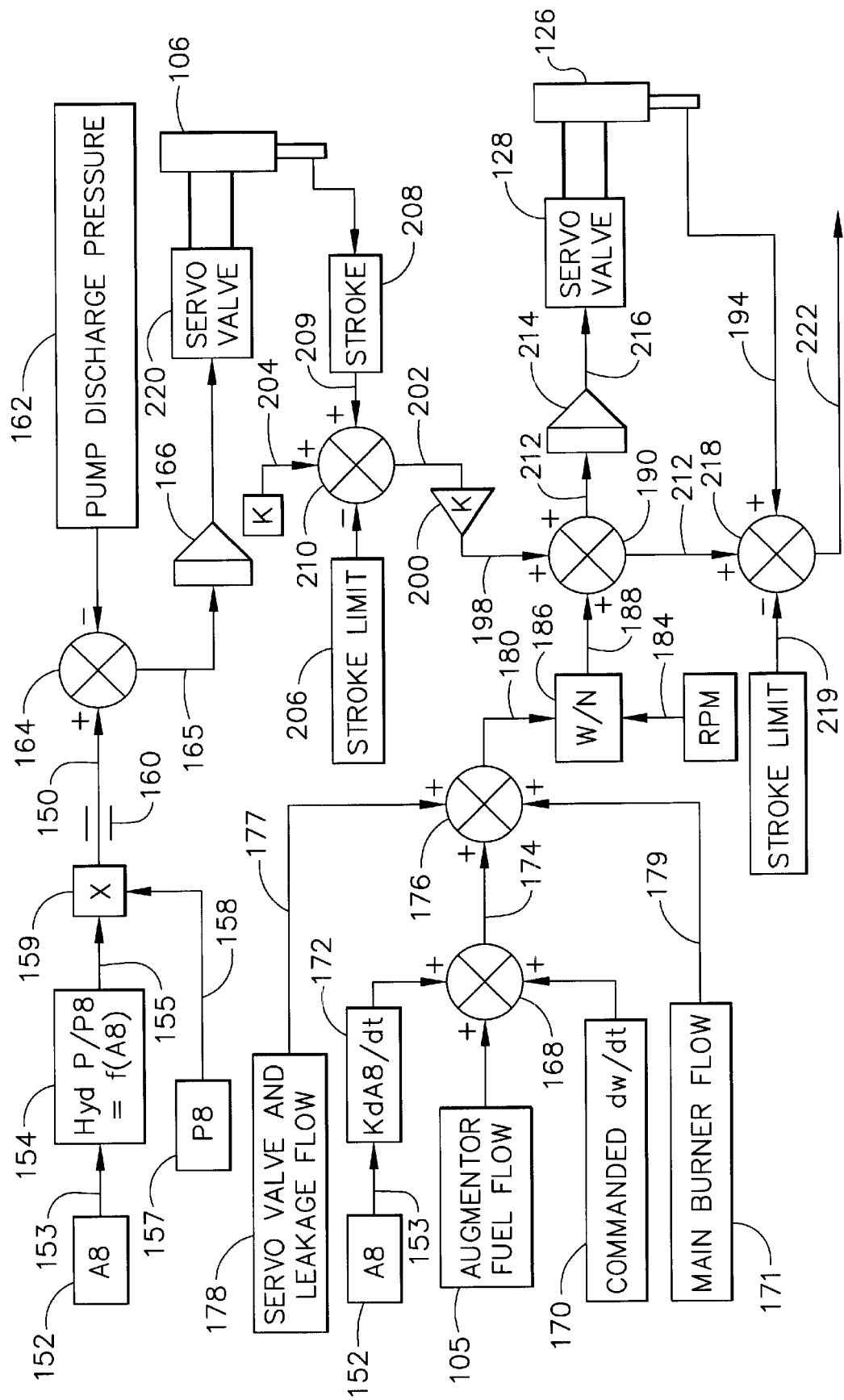
FIG. 3 is a block diagram showing the input parameters, the manipulative steps to which the input parameters are subjected, and the resulting output parameters for controlling augmentor fuel flow and exhaust nozzle area for the fuel system shown in FIG. 2.

FIG. 3 shows a logic diagram for the determination and control of augmentor pump fuel pressure and fuel flow. Control of augmentor pressurizing valve 106 is effected utilizing an hydraulic demand pressure that is calculated based upon sensed conditions at the engine exhaust nozzle. A position transducer (not shown) associated with the exhaust nozzle actuation system provides a signal 152 that is representative of the exhaust nozzle throat area. Area signal 152 is conveyed over line 153 as an input to a function generator 154 that includes a nozzle actuator pressure demand map in which nozzle actuator hydraulic pressure is presented as a function of nozzle throat area to determine a required hydraulic pressure characteristic 155. A signal representative of exhaust nozzle throat static pressure 157 is conveyed over line 158 to a multiplier 159.

Pressure characteristic 155 and exhaust nozzle throat pressure 157 are multiplied in multiplier 159 to yield an hydraulic demand pressure 150. A pressure signal limiter 160 serves to provide maximum and minimum limits to hydraulic demand pressure 150, which passes to a summing junction 164 and is compared with the sensed actual augmentor pump discharge pressure value 162. The resulting error signal 165 is integrated at integrator 166 and the integrated signal passes to servo valve 220 that controls the position of pressurizing valve 106, resulting in modulation of the fuel pressure to achieve the hydraulic demand pressure. The hydraulic pressure signal corresponding with the modulated augmentor fuel pump discharge pressure 162 is provided by a suitable pressure transducer (not shown) that is also an input to engine electronic control 64.

Also shown in FIG. 3 is the logic sequence for regulating the fuel flow rate provided by augmentor fuel pump 94. In essence, the several flow demands on the augmentor pump are added and the stroke of pump actuator 126 is modified as necessary to meet the flow is demands. In that regard, a fuel flow demand represented by the flow opening in augmentor fuel control valve 104 is an input quantity to a first flow-demand summing junction 168 and is provided as a signal 105 that is a function of the control valve position. A second input parameter to first flow-demand summing junction 168 is a flow rate change signal 170 that represents the commanded rate of change of augmentor fuel flow, which is a function of the rate of change of power lever position and which is provided as an anticipatory flow rate change in augmentor fuel pump flow.

A third input parameter to first flow-demand summing junction 168 is a calculated fuel flow value that represents the flow required to actuate exhaust nozzle actuators 120 and 122 in response to the power demand reflected by the change in power lever position. Exhaust nozzle throat area signal 152 is transmitted on line 153 to differentiator 172, where nozzle throat area signal 152 is differentiated with respect to time, and that derivative can be multiplied by a constant that is selected based upon actuator rod end and head end areas and the number of actuators. The resulting product is transmitted to summing junction 168, and the added signals provide a resulting flow signal 174 that is conveyed to a second flow-summing junction 176.

Also provided to second flow-summing junction 176 over line 177 is a combined servo flow and valve leakage flow signal 178 that is representative of the fuel flow needed for operating the various servo valves, and also reflecting a value representative of anticipated fuel leakage within the pump. For simplicity, signal 178 can be provided as a predetermined constant value, as an estimated flow requirement, or, alternatively, it can be a variable value that is a function of the outlet pressure of augmentor fuel pump 94. A third input to second flow-summing junction 176 is a flow signal 171, provided over line 179, which is representative of the fuel flow rate from augmentor fuel pump 94 to main fuel valve 78. Thus, if main fuel pump 62 is operating properly flow signal 171 is zero.

The resulting output signal 180 from second flow-summing junction 176 is a flow-related signal that passes to a divider 186 to which is also provided over line 184 a speed signal 185 that is representative of the rotational speed of the main engine and that is related to the rotational speed of the augmentor pump. The output signal 188 from divider 186 is the result of dividing output signal 180 by speed signal 185 and is representative of one control parameter for controlling the fuel flow of augmentor fuel pump 94. For a variable-vane-type variable displacement pump, pump actuator displacement is related to the stroke of the piston of actuator 126 that regulates the position of the pump inner annular ring relative to the pump rotor body, the position of which is controlled to provide the desired flow rate from the augmentor pump. Output signal 188 is fed from divider 186 to a stroke-correction-summing junction 190.

An additional input to stroke-correction summing junction 190 is a signal that is provided over line 198 when pressurizing valve 106 is at its physical limit. A demand for additional flow from augmentor pump 94 will cause the pressurizing valve to back away from the limit. In that regard, the stroke of the actuator associated with pressurizing valve 106 is monitored by position transducer 208 that provides an actuator stroke position signal 209 to summing junction 210. Position signal 209 is combined with a stroke limit value 206, and also with a constant 204 that represents the difference between stroke limit value 206 and a maximum desired stroke, which is slightly below the physical stroke limit value. The output signal 202 from summing junction 210 is modified by a constant 200 and the resulting output value 198 is added to stroke-correction summing junction 190. As a consequence, the pump flow is increased and the pump output pressure is raised to allow the pressure demand to be met.

The output signal 212 from stroke-correction summing junction 190 represents the change in augmentor fuel pump actuator stroke necessary to respond to engine operating conditions and power demand. Output signal 212 is amplified to a desired signal strength value in an amplifier 214, and the amplified signal 216 passes to servo valve 128 that is operatively connected with the pump stroke control element, actuator 126, that controls the fuel flow rate provided by augmentor fuel pump 94.

A stroke feedback signal 194 representative of the actual stroke of augmentor pump actuator 126 is provided by a position transducer (not shown). Stroke feedback signal 194 is provided to a maximum-stroke-summing junction 218 that is provided with a reference signal 219 representative of the maximum allowable physical stroke of pump actuator 126. Output 212 of stroke-correction summing junction 190, which is determined from the power output demanded from the engine as well as from the several engine operation parameters, is also fed to maximum-stroke-summing junction 218 and is compared with the actual pump actuator stroke represented by stroke feedback signal 194. If that comparison results in a demanded actuator stroke that exceeds the maximum allowable actuator stroke, then a resulting flow limiting signal 222 is provided to augmentor fuel control valve 104 to partially close the valve to reduce augmentor fuel flow demand to maintain satisfactory engine operation within the operating capability of augmentor fuel pump 94.

As will be appreciated by those skilled in the art, under normal engine operation, during which the engine main fuel system is functioning properly, there is no need for backup fuel flow from the augmentor fuel system to the main fuel system. But in the event of a malfunction that disrupts the flow of fuel to main fuel control valve 78, augmentor fuel system 54 described herein can provide fuel pumping capacity to supplement or to replace the pumping capacity of the main fuel system that has been lost. Thus, augmentor fuel pump 94, which is in constant operation to provide pressurized fuel to operate the exhaust nozzle actuation system, is available to serve as a backup fuel pump to main fuel pump 62, to supply fuel to main fuel control valve 78 as well as to actuators 86, 90 for the compressor stator vanes and for the fan variable inlet guide vanes, respectively.

Figure 4:
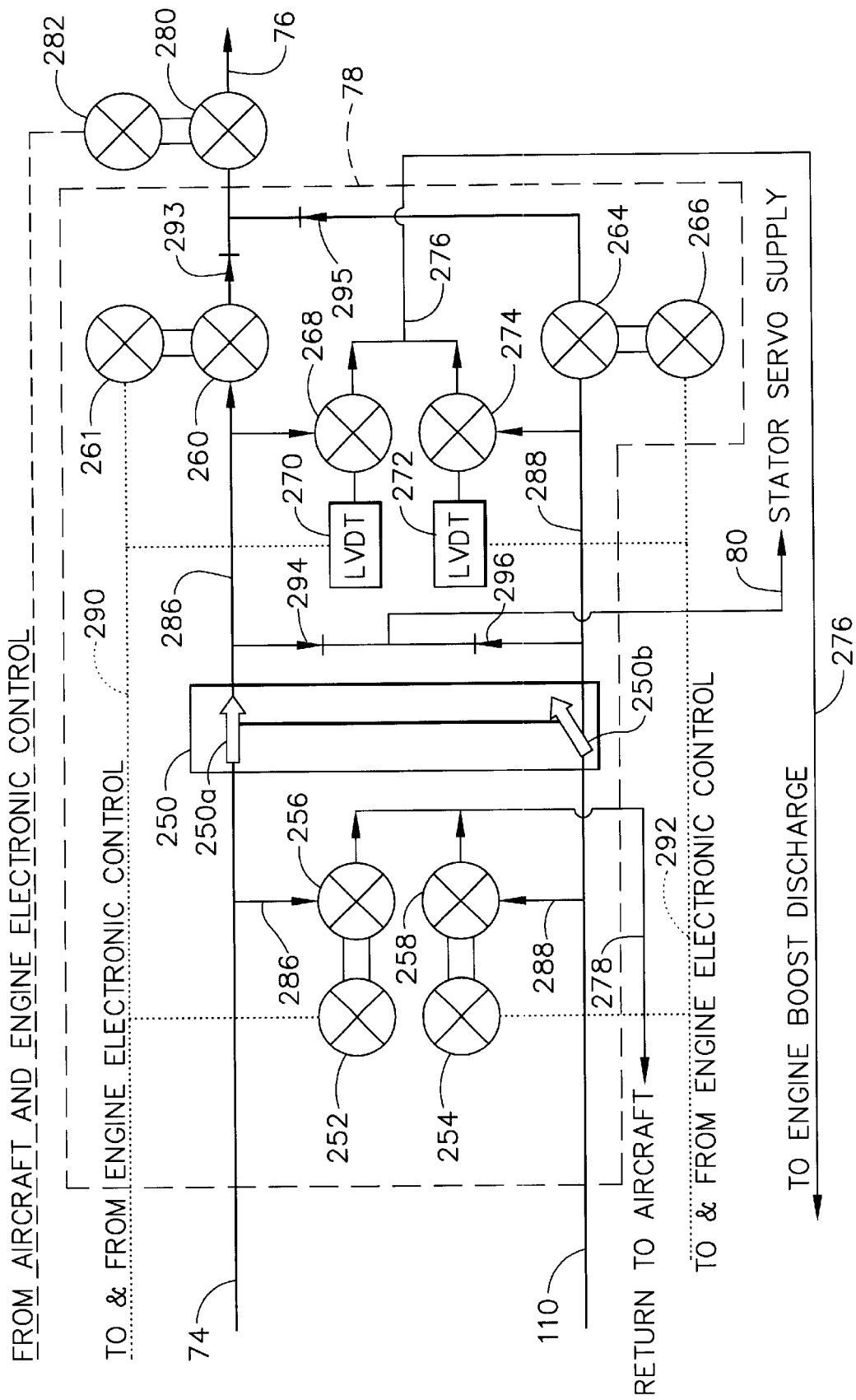
FIG. 4 is a schematic diagram of a redundant fuel metering valve that can be utilized in the fuel system shown in FIG. 2.

Main fuel control valve 78 includes built-in redundancy to provide two distinct fuel metering and flow control pathways, so that at least one of the two pathways can continue to meter and control fuel flow to combustion chamber 30 in the event the other pathway becomes inoperative. FIG. 4 shows a schematic diagram of the functional elements of main fuel control valve 78 that control fuel flow from the respective main and augmentor systems. Pressurized fuel from main fuel pump 62 is provided through inlet conduit 74 and pressurized fuel from augmentor fuel pump 94 is provided through inlet conduit 110. A pressurizing and shutoff valve 280 downstream of control valve 78 serves to prevent fuel flow to combustion chamber 30 until a predetermined minimum fuel pressure is achieved at the outlet of control valve 78, so that sufficient fuel pressure is available both at the fuel nozzles and also at servo valves 84, 88 to operate the engine variable geometry, such as compressor stator vanes and fan inlet guide vanes, respectively. Servo flow for valves 84, 88 is provided from the main metering valve, at a point downstream of selector valve 250, through check valves 294 or 296, depending upon the active pressure source.

Pressurizing and shutoff valve 280 is controlled by servo valve 282, which receives signals from engine electronic control 64 to maintain the predetermined minimum fuel pressure in conduit 74. The predetermined minimum fuel pressure will normally be governed by fan and compressor variable geometry load demands, as well as the fuel pressure requirements at the fuel nozzles within combustion chamber 30, but it can be raised to a higher, computed value if augmentor fuel pump 94 is incapable of providing adequate hydraulic pressure over branch conduit 110 for exhaust nozzle actuation. The backup hydraulic flow will proceed via branch conduit 110 through check valve 112 to supply the exhaust nozzle actuators with pressurized fuel for nozzle actuation. Further, in addition to its pressurization function, valve 280 also has a fuel shut-off function to respond to a pilot-originated command to shut down the engine.

Upstream of pressurizing and shutoff valve 280, a dual inlet and dual outlet selector valve 250 receives fuel flow from main fuel pump 62 via conduit 74 and from augmentor fuel pump 94 via conduit 110. Selector valve 250 includes a pair of valve members 250a and 250b that are functionally interconnected so that only one of the valve members is operative at any given time to allow fuel flow through main fuel control valve 78. The interconnection can be a mechanical interconnection such that when one of valve members 250a, 250b is open to allow flow from one of fuel pumps 62 and 94, the other valve member is closed and blocks flow of fuel from the other of fuel pumps 62 and 94. Selector valve 250 can be operated by the pilot of the aircraft, or it can be an automatic transfer arrangement based upon a signal from engine electronic control 64, with a built-in preference for main fuel pump 62 as the normal source of fuel flow, to combustion chamber 30 and to the actuators for the engine variable geometry elements. All servos associated with main fuel control valve 78 are operated by flows drawn from conduits 286 and 288.

Selector valve 250 includes outlet conduits 286 and 288 that supply fuel to a pair of independent fuel metering valves 260 and 264, respectively. Metering valves 260, 264 are operated by respective servo valves 261, 266 that receive valve position command signals over lines 290, 292, respectively. The positions of metering valves 260, 264 are controlled through respective feedback loops to set flow areas that allow metering of the required flow of pressurized fuel that flows through pressurizing and shutoff valve 280 and to the fuel nozzles in the main engine combustion chamber.

A pair of independent bypass valves 268, 274 have their inlets connected with respective conduits 286, 288. Bypass valves 268, 274 are each provided to maintain a predetermined pressure drop across their respective metering valves. 260, 264. Bypassed flow passes through a common bypass conduit 276 to return to the discharge volute of engine boost pump 58. The positions of each of bypass valves 268, 274 is controlled by position controllers 270, 272, respectively, which can be linear variable differential transformers or the like. Engine electronic control 64 provides signals over lines 290, 292 to position controllers 270, 272, respectively, to regulate the flow output of main fuel pump 62 by positioning bypass valves 268, 274 near the closed position, thereby reducing to a minimum the pumping heat energy input to the fuel.

Extending between and interconnecting fuel conduits 74 and 110 is a fuel return conduit 278 in which are provided a pair of return valves 256, 258 that are connected with conduits 286, 288, respectively. Return valves 256, 258 are operable to return fuel to the aircraft fuel tank through return conduit 278 when engine fuel temperature exceeds a predetermined temperature limit. The positions of return valves 256, 258 are controlled by respective servo valves 252, 254 that receive command signals from engine electronic control 64 over lines 290, 292, respectively.

As will be appreciated, main fuel control valve 78 provides two distinct fuel metering flow paths with redundant metering valves, redundant bypass valves, and redundant flow return valves. Although each of the redundant elements is continuously operable, the positions of valve members 250a and 250b within selector valve 250 will determine through which of fuel conduits 286, 288 fuel is provided to conduit 76. Consequently, a failure in one fuel metering pathway will not disable the engine because switchover to the parallel fuel metering pathway will provide the necessary fuel flow to enable continued engine operation. Check valves 293, 295 serve to prevent loss of flow from the pressure source that is selected by selector valve 250.

Figure 5:
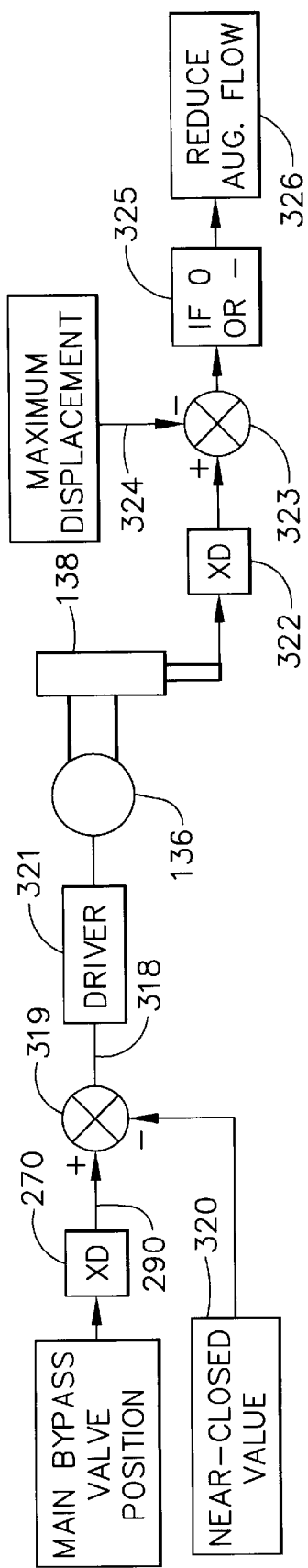
FIG. 5 is a logic diagram showing the flow control logic for controlling fuel flow from the main fuel pump.
Figure 6:
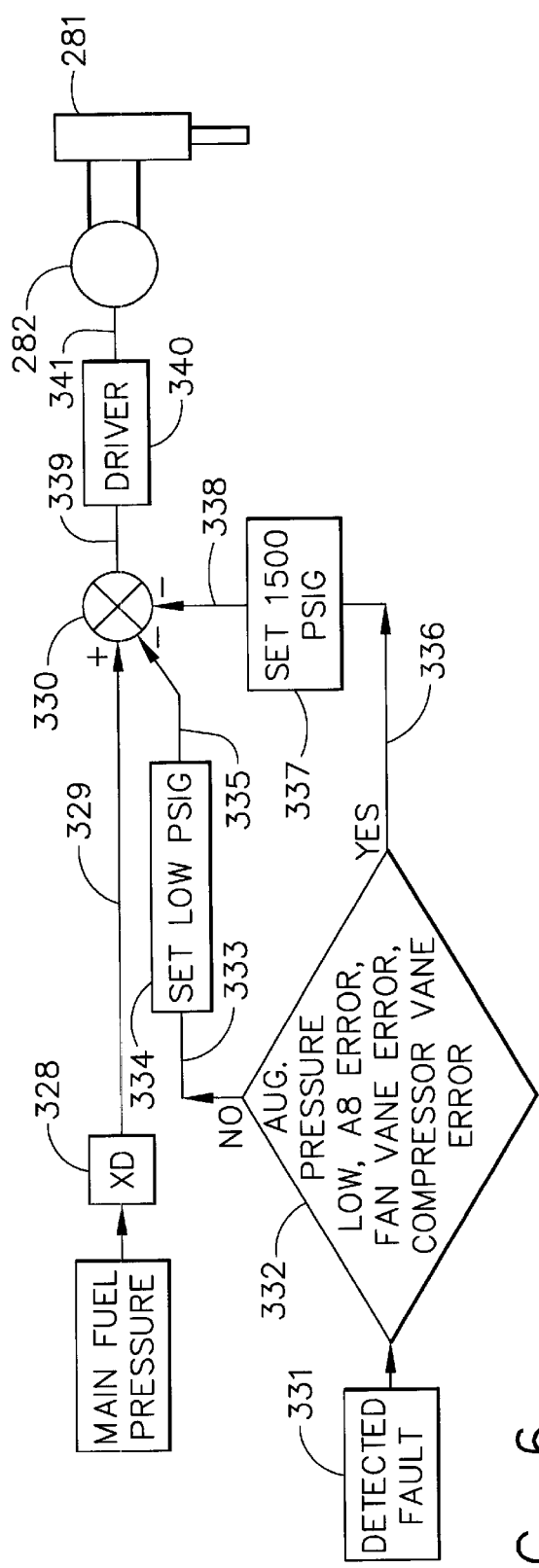
FIG. 6 is a logic diagram showing the pressure control logic for controlling fuel pressure.
Figure 7:
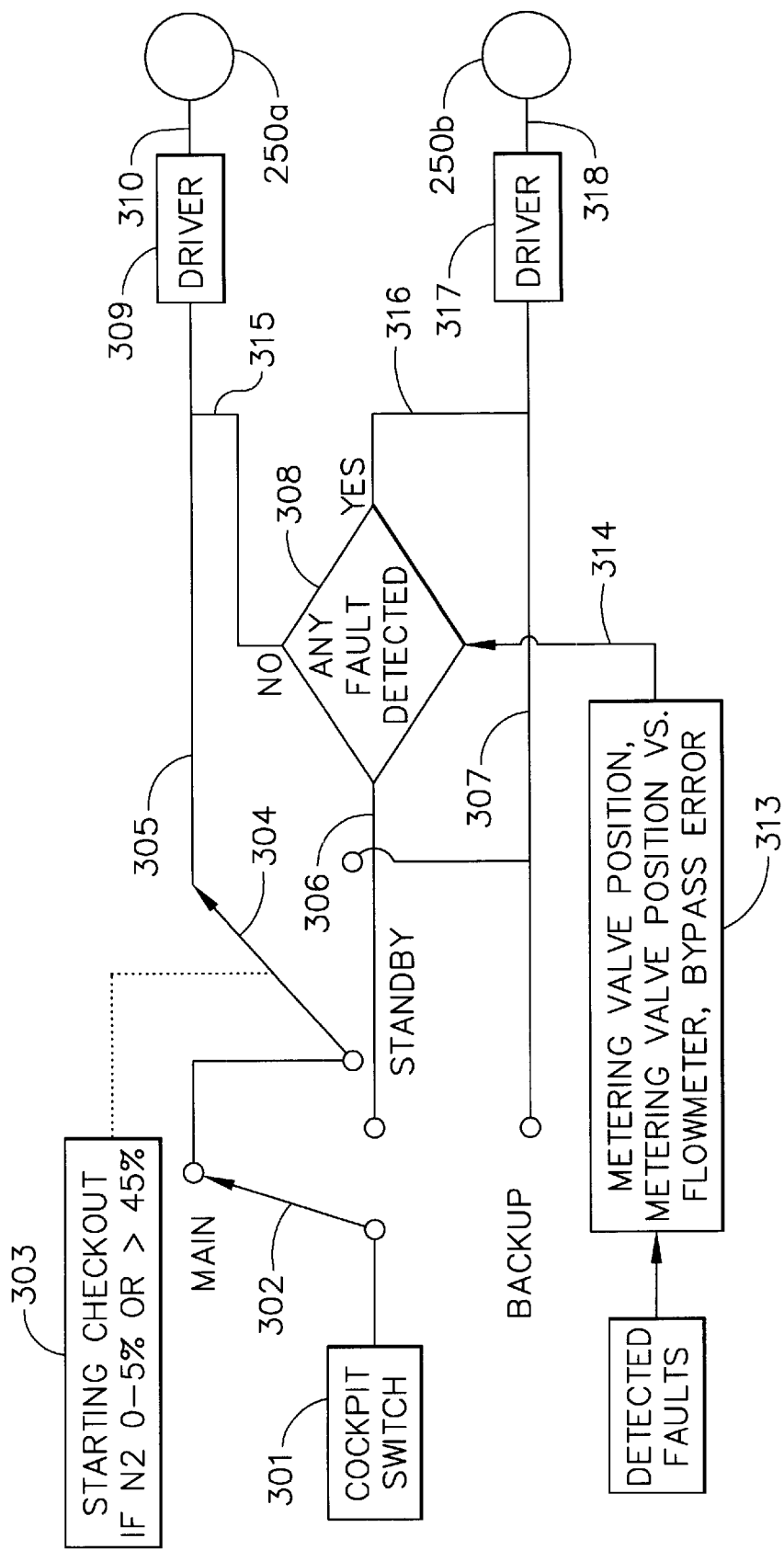
FIG. 7 is a logic diagram showing the pump selection control logic for selecting between the main fuel pump and the augmentor fuel pump.

FIGS. 5, 6, and 7 show control and selection logic for the main and augmentor fuel systems. The control and selection logic shown involves a combination of flow control and pressure control, and flow control logic for monitoring and controlling fuel flow to main engine combustion chamber 30 and to the variable geometry elements, either from main fuel pump 62 or from augmentor fuel pump 94.

The fuel flow rate delivered by main fuel pump 62 is a function of the position set by actuator 138 through the operation of servo valve 136. Referring to FIG. 5, the flow from pump 62 is managed to a practical minimum by detection of the actual position of main fuel system bypass valve 268 (see FIG. 4) by means of transducer 270. A servo valve signal is provided over line 290 to a summing junction 319, where that position is compared with a desired minimum flow position 320., The difference between the actual valve position and the desired minimum flow position is fed over line 318 to a driver 321, the output of which serves to position servo valve 136 to thereby control the position of pump actuator 138, which, in turn, sets the displacement of main fuel pump 62. The position of pump actuator 138 is sensed by a position transducer 322 for comparison at summing junction 323 with the maximum displacement value 324 to provide an output signal 325. Whenever output signal 325 is zero or negative, indicating that main fuel pump 62 is at its maximum output capacity, a signal 326 is delivered to the augmentor fuel control logic (not shown) to reduce that part of the augmentor flow that is then being delivered to the main fuel control.

Main fuel pressurizing and shutoff valve 280 (see FIG. 4) is controlled in a conventional manner to set a fuel pressure level above the discharge pressure of boost pump 58, typically of the order of about 300 psig. Referring now to FIG. 6, the main fuel pump output pressure in conduit 74 is sensed by a transducer 328 that provides a pressure signal over line 329 to summing unction 330. Pressurizing and shutoff valve 280 is controlled by servo valve 282, which receives a control signal 341 from a driver 340 that is, in turn, responsive to a pressure signal 339 from summing junction 330. When a fault 331 is detected by electronic engine control 64 actuator 281 is operated to increase the fuel pressure to a desired higher level. Examples of faults indicating the need for additional main fuel pressure are low augmentor fuel pressure, exhaust nozzle throat area error, fan vane position error, and compressor vane position error. When a higher pressure is required as a result of a fault detected in decision block 332, fault signal 336 is operative to set a predetermined higher pressure 337, for example 1500 psi, which passes over line 338 to summing junction 330. The higher pressure value is selected to assure a pressure level that is high enough to close the exhaust nozzle sufficiently to provide a safe minimum engine thrust. When no faults are detected, a no-fault signal passes over line 333 to set a predetermined low pressure level 334 over line 335 to summing junction 330.

FIG. 7 shows the logic steps for positioning selector valve 250 (see FIG. 4) to select either main fuel pump 62 or augmentor fuel pump 94 to supply fuel to combustion chamber 30. A pilot-operated selector switch 301 that has three positions: main, standby, and backup is located in the aircraft cockpit. When the main position is manually selected by moving selector 302, a signal is provided through switch 304 to line 305 and to driver 309 to power a selector solenoid (not shown) by a signal provided over line 310 to position selector valve 250 to open valve member 250a, and thereby allow fuel flow from main fuel pump 62 to flow to pressurization and shutoff valve 280.

As an initial check of the fuel system components, and in order to assure that both fuel pumps are operative prior to each flight, an engine RPM signal 303 is provided to switch 304 when main engine speed is either between 0 and 5% or is greater than 45%. Signal 303 activates switch 304 to provide a signal over line 307 to allow engine starts to be made with fuel from augmentor fuel pump 94 during part of each start by virtue of the actuation of valve member 250b to the operative position. The signal on line 307 actuates driver 317 to power the selector solenoid (not shown) by a signal provided over line 318 so that selector valve 250 is positioned to open valve member 250b, to thereby allow fuel from augmentor fuel pump 94 to flow to main fuel control valve 78. The functioning of the system to allow the augmentor fuel system to serve as a backup to the main fuel system can thereby be checked.

When selector 302 is moved to the standby position a signal is provided over line 306 to a fault detection decision block 308. The selection between main fuel pump 62 and augmentor fuel pump 94 is determined automatically by whether any engine variable geometry faults have been detected. An example of a fault that can serve to divert augmentor fuel flow to pressurizing and shutoff valve 280 is improper positioning of main fuel metering valve 260. When a fault 313 is detected a fault signal 314 is provided to decision block 308, from which an output signal is provided over line 316 to line 307 to actuate driver 317 to power the selector solenoid (not shown) by a signal provided over line 318 so that selector valve 250 is positioned to open valve member 250b and thereby allow fuel from augmentor fuel pump 94 to flow to main fuel control valve 78.

When selector 302 is moved to the backup position, a signal is provided over line 307 to driver 317 to power a selector solenoid (not shown) by a signal provided over line 318 so that selector valve 250 is positioned to open valve member 250b to provide fuel to main fuel control valve 78 from augmentor fuel pump 94.

Figure 8:
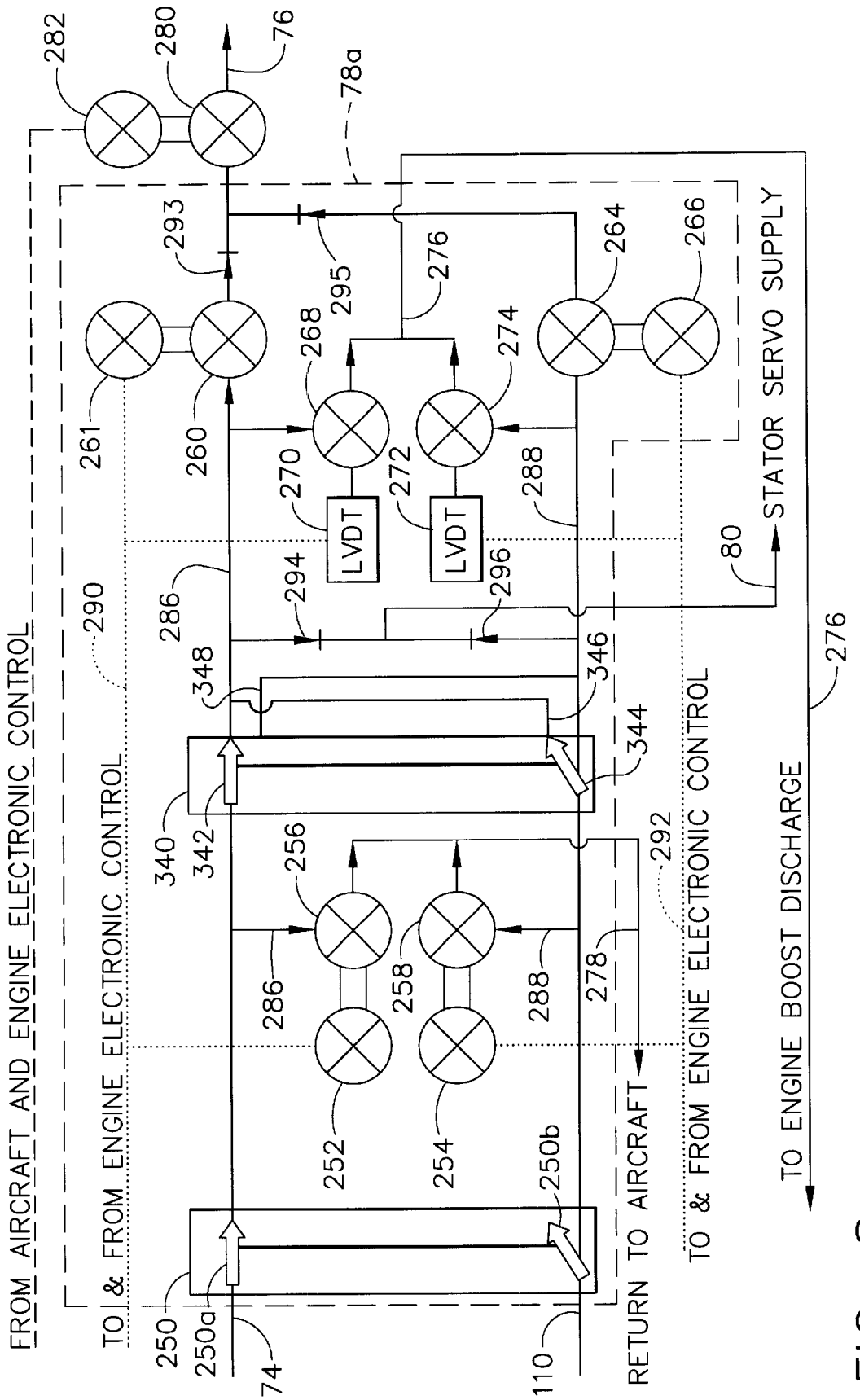
FIG. 8 is a schematic diagram similar to that of FIG. 4. showing another embodiment of a redundant fuel metering valve.

FIG. 8 is a schematic view of another embodiment of a redundant fuel control valve 78a. Valve 78a includes similar components to those of valve 78 shown in FIG. 4, with the addition of a transfer valve 340. In the FIG. 8 embodiment selector valve 250 is upstream of return valves 256, 258, and transfer valve 340 has a structure that is similar to that of selector valve 250. In that regard, transfer valve 340 includes a pair of valve members 342 and 344 that are functionally interconnected so that only one of the valve members is operative at any given time to allow fuel flow through main fuel control valve 78a. The interconnection can be a mechanical interconnection such that when one of valve members 342, 344 is open to allow flow from one of fuel pumps 62 and 94, the other valve member is closed and blocks flow of fuel from the other of fuel pumps 62 and 94. Transfer valve 340 can be manually operated by the pilot of the aircraft, or it can be an automatic transfer arrangement based upon a signal from engine electronic control 64, with a built-in preference for main fuel pump 62 as the normal source of fuel flow, to combustion chamber 30 and to the actuators for the engine variable geometry elements. Transfer valve 340 allows flow of fuel from main fuel conduit 74 to conduit 286 when valve member 342 is in the position shown in FIG. 8. Valve member 344 is then in communication with conduit 286 through conduit 346.

When transfer valve 340 is shifted to its alternate position (not shown), valve member 342 is in communication with conduit 348 to enable the flow of fuel from main fuel conduit 74 to conduit 288. Valve member 344 also is open to allow communication with conduit 288, with flow through valve member 344 dependent upon the position of valve member 250b of selector valve 250.

Although not shown in the drawings for purposes of clarity of illustration, it will be appreciated by those skilled in the art that additional position transducers and feedback loops can be provided for feedback control of the positions of the several actuators. It will also be appreciated that the electronic logic can be either of an analog or a digital nature.

Although particular embodiments of the present invention have been illustrated and described, it will be apparent to those skilled in the art that various changes and modifications can be made without departing from the spirit of the present invention. Accordingly, it is intended to encompass within the appended claims all such changes and modifications that fall within the scope of the present invention.

What is claimed is:

1. A fuel system for an augmented aircraft gas turbine engine, said fuel system comprising:
   a main fuel system including a main fuel pump for providing pressurized fuel to a main engine combustion chamber;
   an augmentor fuel system including a unitary, variable displacement augmentor fuel pump for providing pressurized fuel to a thrust augmentation system, wherein the augmentor fuel system is operatively connected with at least one engine variable geometry control system for providing pressurized augmentor fuel for operating at least one pressurized-fluid-operated actuator for positioning a variable geometry element of the at least one engine variable geometry system in response to engine operating conditions and power output demands, and wherein the augmentor fuel pump is driven independently of the main fuel pump.

2. A fuel system in accordance with claim 1, wherein the at least one engine variable geometry control system includes an exhaust nozzle area control system.

3. A fuel system in accordance with claim 1, wherein the at least one engine variable geometry control system includes a compressor stator position control system.

4. A fuel system in accordance with claim 1, wherein the at least one engine variable geometry control system includes a fan guide vane position control system.

5. A fuel system in accordance with claim 1, wherein the main fuel system includes a main fuel control valve, and the augmentor fuel system is connected with the main fuel control valve for providing pressurized augmentor fuel for supplying the main fuel system in the event of a main fuel system malfunction that affects main fuel system fuel flow.

6. A fuel system in accordance with claim 1, wherein the augmentor fuel pump is a variable vane pump.

7. A fuel system in accordance with claim 1, including a pressurizing valve positioned downstream of the augmentor fuel pump for controlling augmentor fuel pump output pressure, wherein the pressurizing valve is regulated as a function of a signal representative of exhaust nozzle throat area and a signal representative of exhaust nozzle throat static pressure.

8. A fuel system in accordance with claim 1, wherein the augmentor fuel pump is in fluid communication with a plurality of exhaust nozzle actuators for controlling the throat area of an exhaust nozzle.

9. A fuel system in accordance with claim 8, wherein the augmentor fuel pump is in fluid communication with a plurality of exhaust nozzle actuators for controlling the outlet area of a converging-diverging exhaust nozzle.

10. A fuel system in accordance with claim 8, wherein the augmentor fuel pump is in fluid communication with the main fuel system for providing backup fuel flow for supplying the main fuel system.

11. A fuel system in accordance with claim 1, including a metering valve within the main fuel system and in fluid communication with a main fuel pump and with an augmentor fuel pump, wherein the metering valve is operable to selectively provide fuel flow to a main engine combustion chamber from one of the main fuel pump and the augmentor fuel pump.

12. A fuel system in accordance with claim 11, including selectable dual fuel metering valves to control fuel flow to the main engine combustion chamber in response to a fault in the main fuel system.

13. A fuel system in accordance with claim 11, wherein the fuel system elements are dual redundant and are selectable to allow normal engine operation when one of the main fuel system and the augmentor fuel system experiences a fault that prevents normal operation of that system.

14. A fuel system in accordance with claim 11, wherein at least one engine variable geometry system is operatively coupled with the main fuel system for receiving pressurized fuel for operating the at least one engine variable geometry system.

15. A fuel system in accordance with claim 1, wherein the main fuel pump is a variable displacement pump.

16. A fuel system in accordance with claim 15, wherein the main fuel pump is a variable vane pump.

17. A fuel system in accordance with claim 1, including a metering valve within the main fuel system and in fluid communication with a main fuel pump and with an augmentor fuel pump, wherein the metering valve is operable to selectively provide fuel flow to an augmentor combustion chamber from one of the main fuel pump and the augmentor fuel pump.

18. A fuel system in accordance with claim 1, including a metering valve within the main fuel system and in fluid communication with a main fuel pump and with an augmentor fuel pump, wherein the metering valve is operable to selectively provide fuel flow to an exhaust nozzle actuator from one of the main fuel pump and the augmentor fuel pump.

19. A fuel system in accordance with claim 1, including a main fuel valve within the main fuel system, wherein the main fuel valve includes a selector valve for smoothly switching fuel flow to the main combustion chamber from one of the main fuel pump and the augmentor fuel pump in response to an operational fault in one of the main fuel system and the augmentor fuel system to maintain fuel flow to the main combustion chamber and maintain continued engine operation.

* * * * *